United States Patent [19]

Arfsten et al.

[11] Patent Number: 5,409,742
[45] Date of Patent: Apr. 25, 1995

[54] METHOD FOR MELTING AND/OR BURNING-IN OF AT LEAST ONE LAYER

[75] Inventors: Nanning Arfsten, Ockenheim; Klaus Kristen, Wiesbaden; Erich Rodek; Herwig Scheidler, both of Mainz-Finthen; Waldemar Weinberg, Mainz-Hechtsheim, all of Germany

[73] Assignee: Schott Glaswerke, Mainz, Germany

[21] Appl. No.: 180,833

[22] Filed: Dec. 27, 1993

Related U.S. Application Data

[63] Continuation of Ser. No. 626,114, Dec. 14, 1990, abandoned.

[30] Foreign Application Priority Data

Dec. 15, 1989 [DE] Germany ............... 39 41 436.1

[51] Int. Cl.⁶ ................. B05D 3/06; B05D 3/02
[52] U.S. Cl. ........................ 427/555; 427/558; 427/559; 427/193
[58] Field of Search .......... 427/554, 555, 556, 559, 427/558, 193

[56] References Cited

U.S. PATENT DOCUMENTS

| | | | |
|---|---|---|---|
| 4,060,662 | 11/1977 | Bergeron et al. | 427/193 |
| 4,343,829 | 8/1982 | Tochikubo et al. | 427/53.1 |
| 4,473,433 | 9/1984 | Bosch et al. | 427/53.1 |
| 4,832,982 | 5/1989 | Mori et al. | 427/53.1 |
| 4,847,138 | 7/1989 | Boylan et al. | 427/555 |
| 4,861,620 | 8/1989 | Azuma et al. | 427/556 |
| 5,143,533 | 9/1992 | Brusasco | 427/554 |
| 5,162,130 | 11/1992 | McLaughlin | 427/555 |

FOREIGN PATENT DOCUMENTS

| | | |
|---|---|---|
| 0342271 | 12/1988 | European Pat. Off. . |
| 201136 | 7/1983 | German Dem. Rep. . |
| 2026007 | 3/1970 | Germany . |
| 2658682 | 12/1976 | Germany . |
| 1292174 | 10/1972 | United Kingdom . |

OTHER PUBLICATIONS

Geiger et al., "Glass Decoration: Decorating Glass Using Laser Technology," *Glass International* (Mar. 1989).
The Concise English Dictionary, p. 150 (1968) no month.
Dictionary of Engineering and Technology, vol. 2, p. 143 (1985).
*Webster's Third International Dictionary*, unabridged, 1961 (no month) p. 300, entry for "burn-in".

*Primary Examiner*—Marianne Padgett
*Attorney, Agent, or Firm*—Millen, White, Zelano & Branigan

[57] ABSTRACT

Large area decorations of glazings, ceramic paint or the like on glass ceramic, glass, ceramic or similar meltable substrates, in particular on glass ceramic cooking plates, are applied by the new method by means of a laser beam which is widened linearly over the entire width of the area to be decorated, as it were in a zone melting method. The linear energy supply zone is advanced at a speed high enough for essentially only the decorating material to be melted on or burnt in but ensuring that the thermal conduction front does not move appreciably into the substrate material.

17 Claims, 1 Drawing Sheet

METHOD FOR MELTING AND/OR BURNING-IN OF AT LEAST ONE LAYER

This application is a continuation of application Ser. No. 07/626,114, filed Dec. 14, 1990, now abandoned.

SUMMARY OF THE INVENTION

The present invention relates to a method for melting and/or burning-in layers of ceramic paints, melts, sintered glasses, glazes, thick-layer films or resinates onto substrates of glass, glass ceramic, ceramic or similar materials. The layer material is applied to the substrate surface and the arrangement is subjected to an energy supply and thereby heated until, by softening or melting of the layer material (and of the substrate), the desired melting or stoving effect is achieved. The arrangement can then be cooled. The invention also relates to a decorated glass ceramic tile or plate.

For decorating glass articles, after the shaping, the decoration is applied by rubber stamp, transfers, screen printing or the like, etc., to the cold glass and, possibly after predrying, the decoration is burnt in by a subsequent tempering process using, tunnel or hood furnaces with gas or electrical heating. As a rule, the decoration stoving or burning-in is carried out simultaneously with the glass cooling or during the tempering of the glasses. It is only in special cases that the decorations are stoved in a process which is provided especially for that purpose, because this leads to a high additional energy expenditure.

Burning-in of the decoration during the glass cooling or in a separate stoving process includes generally the following phases:

—a first heating-up phase with a predetermined temperature/time ratio
—a holding phase for burning out the organic constituents of the decoration,
—a second heating-up phase with a predetermined temperature/time ratio,
—a holding phase at maximum temperature for the decoration burning-in with simultaneous equalization of stresses in the glass,
—a cooling phase, the temperature rate of which depend on the wall thickness of the glass article wherein the article is cooled down to temperatures lying about 10 to 20K beneath the lower cooling temperature of the respective glass, and
—cooling to room temperature with a predetermined temperature/time ratio.

In this known method for decoration stoving, the entire glass body is brought to the flow temperature of the enamel. Since the articles must not deform when this is done, a necessary requirement is that the flow temperature of the enamel is lower or at the most equal to the upper cooling temperature of the glass.

The transformation temperatures of float glass (window glass) and of borosilicate glasses (Pyrex types) are of the order of magnitude of 530° C. to 550° C., while the upper cooling point ($=\eta 10^{13}$ Poise) is at about 570° C. Thus, suitable enamel paints must flow at temperatures below 600° C., i.e., have viscosities beneath about $10^2$ Poise. This is achieved for example with lead borate and/or lead glasses. These melts have thermal coefficients of expansion in the range of $\alpha = 9 \times 10^{-6}/K$ to $12 \times 10^{-6}/K$. To obtain largely stress-free decorations, the thermal coefficients of expansion of the substrates and the decoration layers should be about the same.

Nevertheless, in spite of their not always optimum stress matching, these paints are also used for decorating borosilicate glasses ($\alpha = 3 \times 10^{-6}/K$) or glass ceramics ($\alpha = \pm 0.2 \times 10^{-6}/K$) because they are available commercially cheaply in a great variety.

In the case of glass ceramics, the decoration firing or burning-in takes place as a rule in the ceramizing process, i.e., the decorations are applied to the special glass (green glass) and burnt in during the ceramizing. A disadvantage is that neither the temperature variation nor the furnace atmosphere can be set in optimum manner for the decoration firing. Consequently, the choice of paints, apart from the matching problems as regards the coefficients of thermal expansion, is restricted to paints which survive the ceramizing process. With regard to the matching problem, restrictions may arise if the decoration, for example, on cooking surfaces, is subjected to high temperature change stresses and mechanical stresses.

A separate decoration firing or burning-in, for example, with completely ceramized glass ceramics, requires a high energy expenditure for optimizing the firing conditions. Also, the additional use of complicated tunnel furnaces or kilns and is expensive. Moreover, it aggravates the matching problem.

Geiger and Urbanek describe in "Glas International", March 1989, page 39 et seq., a method for decorating glass with the aid of laser beams. A decoration is written punctiform by a computer-controlled laser onto a small hollow glass vessel (vases, drinking vessels, etc.) which have previously been covered over their entire area with a decoration paint, for example an enamel, by spraying, imprinting, etc. Although only small areas are involved, this operation requires a long time because of the punctiform firing.

DD PS 201,136 describes a similar method in which, apart from enamel paints metal oxides, metal nitrides and metal salts are also used. In this case, also, the decoration is drawn onto the hollow glass article coated over its entire area with a finely focused punctiform laser beam having a power of 20 to 200 watts.

In a modification of this method, thin metal stencils of the decoration are secured to the article coated over its entire area and this arrangement subjected to laser energy by scanning the stencil.

The latter method of DD PS 201,136 has several disadvantages. The stencil is partially highly heated by the linewise scanning with the punctiform laser beam for a short time at the beginning and end of each line. This causes distortions and deformations, in particular at the contour edges, rapidly making the stencil unusable. The greater the stencil area, the greater the deformations by the partial heating become so that this method, apart from the high costs for making the stencil, is not suitable for decorating large areas.

A further disadvantage is that there is no freedom as regards the decoration design because the areas to be covered by the stencil must be connected together with webs.

The scanning with a laser in the methods hitherto known also has the disadvantage that the burning-in zone is punctiform. As a result, on moving over the surface with the laser beam, overlapping zones necessarily occur in which the layer material is melted twice. This results in anisotropy in the layer and in the material. As a consequence, a shelling off of the decoration can occur.

Furthermore, a laser decorating method has already been proposed for making color pictures on glass or ceramic articles in which the color picture provided is applied as a whole to the article to be decorated and thereafter fixed by means of a laser beam which directly illuminates the entire picture area. The disadvantage of this method resides in that an energy-intensive laser of extremely high power with a beam diameter corresponding to the picture area is necessary and must illuminate the entire area with locally uniform intensity. Such lasers are not yet available today for production applications and great difficulties are involved in the uniform treatment of $m^2$-magnitude areas by optically expanded laser beams.

The problem underlying the invention is to provide a decoration firing method for burning-in large area decorations on flat glass (e.g., decorations on window panes for domestic ovens) and glass ceramic panes (e.g. cooking surface decorations on glass ceramic cooking plates) which reduces or eliminates the problems regarding matching of the thermal coefficients of expansion of the enamel and substrate glass in such a manner that enamel paints of any flow temperatures can be used and can be selected independently of the transformation temperature of the substrate glass. In particular, the method is also intended to make possible to use enamel paints having a flow temperature substantially higher than the transformation temperature of the substrate materials. Furthermore, in particular in decorating glass ceramics, the burning-in of the paints is to be uncoupled from the ceramizing process to make it possible to also use decoration paints which are unsuitable for the temperatures occurring during ceramizing. Also, the energy amounts necessary for the decoration firing are to be small and the production rates are to be improved.

This problem is solved according to the invention in a method wherein the energy supply is effected with a laser beam widened linearly over the entire width of the surface to be decorated on the side provided with the layer material, and that the linear energy supply zone by a relative movement is displaced parallel to the substrate surface so that the linear energy supply zone sweeps over a desired area on the coated side of the substrate, the energy supply per unit area of the substrate being effected with an intensity and time limitation such that substantially only the necessary heating of the layer material and of the substrate surface adjoining it takes place and the energy supply is interrupted again before the temperature gradient of the thermal conduction front has moved appreciably into the substrate material. The energy supply for melting and/or burning-in of a layer of ceramic paint, melt, sintered glass, glaze, also in the form of a thick-layer film or with a temporary organic binder, for example a resinate, on a substrate of glass, ceramic or similar material, preferably glass ceramic, from the side intended for the layer material is carried out per unit area of the substrate only with an intensity and time limitation such that substantially only the necessary warming of the layer material and the substrate surface adjoining the latter takes place and the energy supply is interrupted again before the temperature gradient of the thermal conduction front can shift appreciably into the substrate material.

By the linear widening of the laser beam over the entire width of the decoration or the substrate and by moving the strip-like zone over the substrate (or the substrate under this zone), a repeated melting of the layer material, with its negative effects on the properties of the molten layer, is avoided. According to the invention, in a manner similar to the zone melt method, a strip-like (linear) melting zone generated by a rapidly deflected laser beam moves over the substrate. By the rapid deflection of the laser beam, the entire coating material disposed beneath the zone is in the molten state. Instead of a linear or strip-like laser beam generated by rapid deflection, it is, of course, also possible to use a laser beam which from the start is strip-like or linear, for example, the beam of a plate laser.

The substrate material should have a low coefficient of thermal conductivity which should be at the most 4 W/mK, preferably 1.0–2.5 W/mK, and has a thickness of at least 0.5 mm, preferably 2–10 mm. As possible substrate material, in particular glass or glass ceramic may be used. Although it is possible to employ other materials, for example, ceramics.

The coated surface of the substrate, which has an area of 50 cm×60 cm to 100 cm×100 cm, preferably 50 cm×60 cm, is heated to the firing or melting temperature of the layer only to a thickness of 0.2–10 $\mu$m, preferably 2–4 $\mu$m, so that chemically or thermally prestressed substrates may also be coated. The layer applied has a thickness of 1–10 $\mu$m, preferably 2–4 $\mu$m.

The linear widening of the laser beam is expediently carried out by means of a rotary mirror which comprises at least three, preferably 6 to 12, as a rule however 12, individual mirror elements arranged without gaps on a cylinder. A laser beam which is itself linear and has adequately high energy, for example, from a plate laser, may also be used.

The rotary mirror projects the laser beam practically in a line onto the substrate surface which is to be coated and which, to avoid angle-induced appreciable temperature differences, is preferably essentially planar or on development gives a planar surface such as, for example, the generating surface of a cylinder. The laser beam impinges on the substrate surface at an angle of 90° to 85°. Since for technical reasons the start and the end of the laser line formed by the rotary mirror usually has a higher energy density, it is advantageous to shut out these regions of the substrate surface preferably by means of air-cooled or water-cooled edge diaphragms.

The laser beam or the laser line preferably sweeps the entire width of the decoration on the substrate surface. The decoration may cover the entire area of the substrate surface or consist of applied points, patterns or the like between which non-decorated substrate surface lies. The laser beam correspondingly burns in the entire layer material applied to the substrate surface so that no residues of the layer material need be washed off or out. The method is thereby considerably more economical than the known methods outlined.

The focal spot of the laser beam advantageously has a focal area of 1 $mm^2$ to 25 $mm^2$, preferably 25 $mm^2$, and sweeps over the substrate, for a substrate width of, for example, 50 cm, with a frequency between 20 to 4000 Hz, preferably 500 to 2000 Hz, giving a relative velocity of the focal spot on the substrate of 10 to 2000 m/s, preferably 250–1000 m/s.

Depending on the laser power used, which is generally 1 kW to 10 kW, the substrate may be moved beneath the quasistationary linearly widened laser beam at a rate of 0.6 to 6 m/min.

Possible lasers are, in particular, UV lasers, including lasers of the group $CO_2$, XeCl, $Kr^+$, ArF, Nd glass and ruby lasers.

Conveniently, in the method according to the invention, the substrate material is preheated to temperatures in the region of the transformation temperature, on the one hand, to burn out the organic decoration constituents before the firing and, on the other hand, to reduce the buildup of thermally produced stresses by partial heating of the substrate glass during the burning-in.

The energy supply for the decoration burning is expediently with the aid of a laser in a linearly limited energy supply zone. The melting on and/or burning-in per unit area of the substrate occurs in such a manner that, for limiting the energy supply with respect to time and with respect to a unit area of the substrate the linear energy supply zone and/or the substrate, execute a relative motion parallel to the plane of the substrate surface.

The linear energy supply zone is generated by deflecting the laser beam with a rotary mirror which moves the laser beam with high frequency at least over the entire width of the decoration, preferably over the entire width of the workpiece. Expediently, a rotary mirror is used which has six mirror faces and rotates at 10,000 revolutions per minute. It generates a deflection frequency of 1000 Hz. For a feed rate of the workpiece of 1 cm per minute and with an irradiating area of the laser widened to 1 cm$^2$, a 1 cm wide strip of the workpiece is thus scanned 60000 times per minute. For example, if for burning-in a high-melting enamel an energy of 300 Ws/cm$^2$ is necessary and the workpiece is 100 cm wide, this leads with a firing duration of 1 minute to a necessary power of 0.5 W/cm$^2$ of the laser beam and a necessary laser power of 5 kW if the diameter of the unwidened laser beam is 0.1 mm. Under the conditions named, ceramic paints with melting temperatures between 1200° C. and 1350° C. were burnt into glass ceramic surfaces which themselves can be heated only briefly to at the most 900° C.

Since the energy distribution of the "focal spot" of the laser beam corresponds to an approximate Gaussian distribution, the laser generates a linear or strip-shape heating zone which is broken down into a preheating zone, a melting zone and a cooling zone which due to the high deflection or scanning frequency of the laser beam specified are to be considered quasistationary. On continuous advancing of the workpiece beneath the linearly widened laser beam, each point of the area to be decorated thus undergoes the same "temperature history" and the decoration is uniformly burnt in.

Before the laser treatment, the decorations are applied by one of the known methods such as by screen printing or as transfers to the areas to be decorated. Ceramic paints, high-melting melts and paints whose flux consists of the particular carrier material may be processed, also in the form of thick-layer pastes, or with temporary organic binders such as metal resinates or similar materials.

By suitable choice of the laser power, scanning frequency of the linear burning-in zone and the advancing speed of the workpiece, the burning-in process can be adapted to the particular requirements or the particular energy consumption of the materials to be melted on. With decorating materials requiring a protective gas or special atmosphere during the melting process, the necessary gas or gas mixture is supplied through slit nozzles before and after the melting zone.

The method is not restricted to the use of specific decorating paints with small coefficient of thermal expansion but can be used with any desired decorating materials, for example, the usual enamel paints, etc., which are used for decorating glass and which have thermal coefficients of expansion of up to $12\times10^{-6}$/K. However, decorating and layer materials are preferred which have a melting point or burning-in temperature which lies above or in the region of the softening or transformation temperature of the substrate because these frequently have a coefficient of thermal expansion which is equal to or less than that of the substrate material and as a result the burning on of the layer generates practically no compressive stress. These layer and decoration materials are, however, only rarely found.

The problem of the matching of the coefficients of thermal expansion of enamel and substrate material can be reduced or eliminated with glasses and glass ceramics of small thermal expansion if, as enamel melt, glasses or ceramics are used having coefficients of thermal expansion that correspond as far as possible to those of the substrate material. In the ideal case, as melt flux of the enamels, glass or the glass ceramic of the substrate is to be used. In this case an automatic matching is achieved for the coefficients of thermal expansion over the entire temperature range traversed on cooling after the decoration firing. Since in this ideal case the moduli of elasticity of melt and substrate are also identical, all that remains is residual stresses caused by the influence of the paint pigments on the melt.

The flow temperatures both of the enamel paints with small coefficient of thermal expansion and of the enamel melts of the particular substrate material are as a rule far above the transformation temperatures of the borosilicate glasses or special glasses used as starting product in the manufacture of glass ceramics.

The burning in of the coating may preferably be carried out during the cooling phase of a tempering process at elevated temperature, for example at 300° to 600° C., preferably just above the transformation temperature of the respective glasses; with glass ceramics, for example burning can be carried out, during the cooling after the ceramizing.

The method is particularly suitable for making coated glass ceramics, especially decorated glass ceramic cooking plates.

Special layer materials are suitable for this purpose which have a high flow temperature, in particular higher than the highest ceramizing temperature. Such layer materials may be particularly hard and resistant to damage and also to discolorations due to high use temperatures of the glass ceramic plate. Preferably, layer materials are used which have flow temperatures in the range of 1200° C. to 1350° C. Thus, for example with glass ceramics, in particular plates withstanding temperatures up to a max. of 900° C., layer materials having flow temperatures in the range from 1000° C. to 1350° C. are also used.

BRIEF DESCRIPTION OF THE DRAWINGS

The method according to the invention will be explained in detail hereinafter with the aid of schematic drawings.

In the drawings.

DETAIL DESCRIPTION

Figure 1:
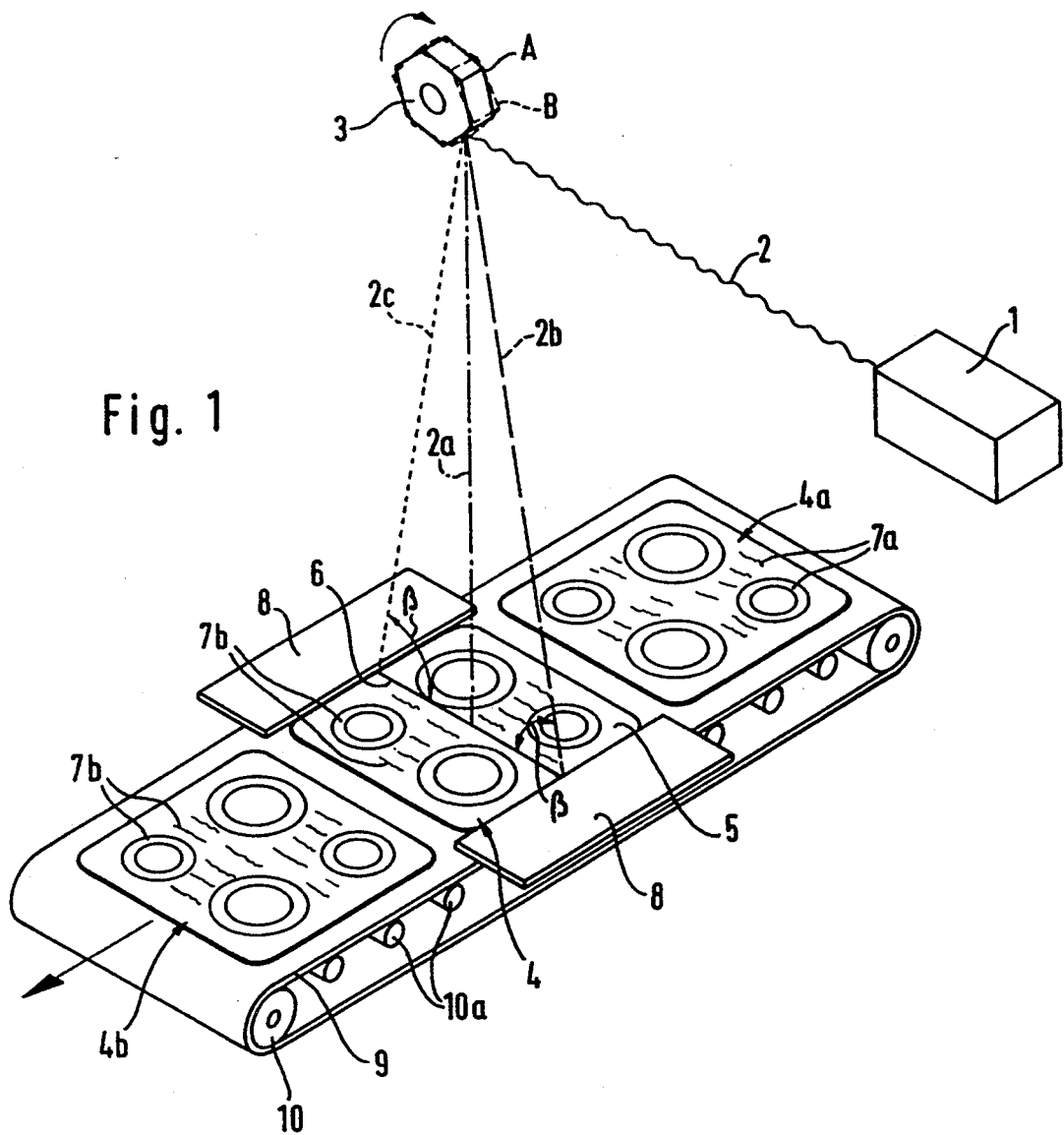
FIG. 1 shows an apparatus for carrying out the method.

In FIG. 1 the beam 2 (wavey line) of a laser 1 is directed onto a rotary mirror 3 which is rotated with high speed in the direction of the arrow and is instantaneously in position A and from there (2a, dot-dash line) deflected onto the surface of a glass ceramic cooking area 4. If the rotary mirror 3 is in position B (dashed line), the beam 2 will be deflected to the one edge of the glass ceramic cooking surface 4 (2b, dashed line). The beam 2 (2c, dotted line) reaches the other edge of the glass ceramic cooking surface 4 in a position C (not shown) of the rotary mirror 3 which is advanced only a few degrees with respect to position B. Due to this deflection (2b, 2a, 2c), the beam 2 on the surface 5 of the glass ceramic cooking area 4 sweeps over a line 6 on which the energy of the beam 2a–c is supplied to the glass ceramic cooking area. Due to the high rotational speed of the mirror a strip-like zone forms in which the decoration or the coating 7 is melted on or burnt into the glass ceramic cooking area.

The start and end of the line 6 have an energy density different than that of the line centre and are therefore each shut out by means of air-cooled diaphragms 8. The angle $\beta$ formed by the start or end of the line 6 with the beam 2b or 2c respectively is preferably not less than 85°, the distance of the rotary mirror from the glass ceramic surface being about 1 m.

To perform a relative movement between the line 6 and the glass ceramic cooking plate 4, the latter lies on a transport belt 9 which is guided via rollers 10 and 10a and with which the glass ceramic cooking surface or area 4 is pushed beneath the line 6 in the direction of the arrow with constant velocity.

Freshly coated glass ceramic cooking plates 4a are continuously moved from the transport belt 9 and as finished glass ceramic cooking plates 4b with burnt-in coating 7b discharged again from the transport belt 9. Conveniently, the transport belt 9 is part of a cooling line in which the freshly ceramized glass ceramic cooking plates are cooled.

Figure 2:
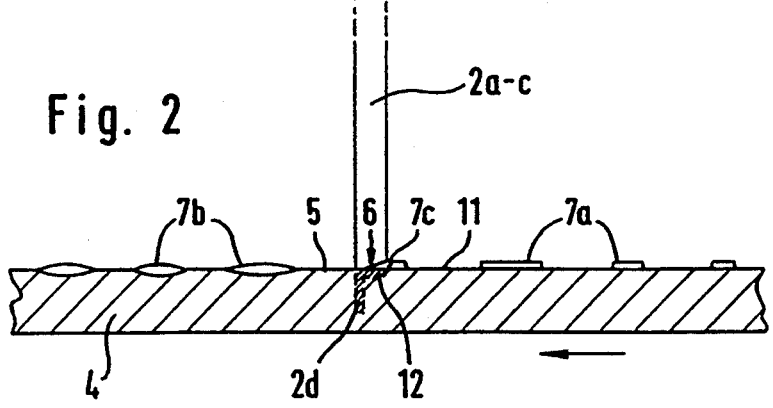
FIG. 2 is a cross-section parallel to the feed direction through a glass ceramic plate during the burning-in process.

FIG. 2 shows an enlarged fragment of a glass ceramic cooking plate 4 in cross-section. The glass ceramic cooking plate 4 is displaced in the direction of the arrow by means of the transport belt 9 (not shown here) so that the coating 7a applied to the glass ceramic cooking plate 4 comes into the region of the line 6 formed by the beam 2a–c and leaves the region as fired coating 7b.

Governed by the displacement velocity of the transport belt 9 and the energy of the beam 2, the energy supply into the coating per unit area of the substrate or of the coating takes place with an intensity and time limitation such that substantially only the necessary warming of the coating 7a and of the surface 5 adjacent said coating takes place. The energy supply is interrupted before the temperature gradient of the thermal conduction front has moved appreciably into the substrate material.

Since as a rule glass ceramics have a low coefficient of thermal expansion and coating materials with similar coefficients of thermal expansion generally also consist of similar high-melting material like the glass ceramic itself, with the method according to the invention it is possible for the first time, in particular, to employ coating materials which do not melt or flow until at a temperature appreciably above the maximum ceramizing temperature or the transformation temperature of the glass ceramic. Coating materials may be used having a melting point or burn-in point in the region of 1200° C. to 1350° C., i.e., in particular coating materials having a coefficient of thermal expansion which is not more than $2.5\times10^{-6}$/K, preferably not more than $1.0\times10^{-6}$/K and in the optimum case only $0.5\times10^{-6}$/K or less different to that of the substrate material.

In the case of glass ceramic cooking plates, the coating materials usually have the larger coefficient of thermal expansion. This is different from the case where glass is the substrate material. Here, in a favorable manner, coatings having a coefficient of thermal expansion smaller than that of the glass material are used, enabling a compressive prestressing to be applied to the surface of the glass.

If glass ceramic cooking plates are coated, which are as a rule ceramized at temperatures below 1000° C., then advantageously coating materials may also be used having a flow temperature in the region of 1000° C. to 1350° C.

We claim:

1. In a method of making a glass, glass-ceramic or ceramic substrate having a surface and a decoration on said surface, said decoration having at least one layer, said substrate having a thermal conductivity of not more than 4 W/mK, wherein said layer is applied to the substrate surface, said substrate and said decoration are subjected to an energy supply and thereby heated until, by softening or melting of said layer and said substrate, a burning-in of said layer is achieved, the improvement comprising:

employing a laser beam to provide said energy supply, said laser beam being applied over the entire width of said substrate surface to be decorated by use of a laser with a linear beam spot or by deflection of a laser beam using a rotating mirror, said laser beam being displacable by relative movement between said substrate and said laser beam in a direction parallel to said substrate surface, and said layer comprising at least one pigment and at least one meltable substance having a thermal expansion coefficient which differs from the thermal expansion coefficient of said substrate by not more than $2.5\times10^{-6}$/K, wherein said layer and said surface of said substrate adjacent said layer are heated by said laser beam to a temperature sufficient to melt said meltable substance of said layer, and said substrate is heated by said laser beam to a depth of 0.2–10 $\mu$m.

2. A method according to claim 1, wherein said substrate has a planar surface.

3. A method according to claim 1, wherein said laser beam is generated by a UV laser.

4. A method according to claim 1, wherein said laser beam is generated by a laser selected from the group consisting of $CO_2$, XeCl, $Kr^+$, ArF, Nd glass and ruby lasers.

5. A method according to claim 1, wherein said substrate is heated to a temperature above its transformation temperature, Tg, prior to application of said energy supply.

6. A method according to claim 1, wherein said meltable substance of said layer has a melting point above the transformation temperature, Tg, of said substrate.

7. A method according to claim 1, wherein the melting point of said meltable substance of said layer is substantially the same as the softening or transformation temperature, Tg, of said substrate.

8. A method according to claim 1, wherein said substrate is prestressed before said energy supply is applied.

9. A method according to claim 1, wherein said substrate is a glass ceramic material and said layer has a flow temperature above the highest ceramizing temperature of said glass-ceramic.

10. A method according to claim 9, wherein said flow temperature of said layer is in the range of 1200° C. to 1350° C.

11. A method according to claim 7, wherein said substrate is made of the same material used as said meltable substance of said layer.

12. A method according to claim 1, wherein said layer is a ceramic paint or sintered glass.

13. A method according to claim 1, wherein said substrate is a cooking surface.

14. A method according to claim 1, wherein said layer has a thickness of 1–10 μm.

15. A method according to claim 1, wherein said laser beam impinges on said substrate at an angle of 85°–90°.

16. A method according to claim 1, wherein said decoration is applied to said substrate surface by screen printing, transfer or rubber stamp.

17. A method according to claim 1, wherein said layer is a glaze.

* * * * *